(12) United States Patent
Landis et al.

(10) Patent No.: US 11,665,715 B2
(45) Date of Patent: May 30, 2023

(54) INDICATION OF MOBILE STATION SUPPORT FOR CANDIDATE KERNELS FOR DIGITAL POST DISTORTION OPERATIONS

(71) Applicant: QUALCOMM Incorporated, San Diego, CA (US)

(72) Inventors: Shay Landis, Hod Hasharon (IL); Gideon Shlomo Kutz, Ramat Hasharon (IL); Assaf Touboul, Netanya (IL); Elad Meir, Ramat Gan (IL)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 17/211,591

(22) Filed: Mar. 24, 2021

(65) Prior Publication Data

US 2022/0312403 A1 Sep. 29, 2022

(51) Int. Cl.
*H04W 72/12* (2023.01)
*H04W 72/04* (2023.01)
*H04W 8/24* (2009.01)

(52) U.S. Cl.
CPC .......... *H04W 72/048* (2013.01); *H04W 8/24* (2013.01); *H04W 72/042* (2013.01)

(58) Field of Classification Search
CPC .... H04W 72/048; H04W 8/24; H04W 72/042
See application file for complete search history.

(56) References Cited

U.S. PATENT DOCUMENTS

| 11,038,739 | B1* | 6/2021 | Landis | H04B 1/1027 |
| 11,258,648 | B1* | 2/2022 | Landis | H04W 76/27 |
| 2021/0119682 | A1* | 4/2021 | Gutman | H04L 25/03006 |
| 2021/0344367 | A1* | 11/2021 | Wolf | H04W 8/24 |
| 2022/0038229 | A1* | 2/2022 | Levy | H04B 1/0475 |
| 2022/0385515 | A1* | 12/2022 | Kutz | H03F 1/3276 |

* cited by examiner

*Primary Examiner* — John D Blanton
(74) *Attorney, Agent, or Firm* — Harrity & Harrity, LLP

(57) ABSTRACT

Various aspects of the present disclosure generally relate to wireless communication. In some aspects, a mobile station may transmit an indication of support for one or more candidate kernels for digital post distortion (DPoD) operations. The mobile station may receive a downlink communication based at least in part on the indication of support for the one or more candidate kernels for DPoD operations. Numerous other aspects are described.

48 Claims, 8 Drawing Sheets

INDICATION OF MOBILE STATION SUPPORT FOR CANDIDATE KERNELS FOR DIGITAL POST DISTORTION OPERATIONS

FIELD OF THE DISCLOSURE

Aspects of the present disclosure generally relate to wireless communication and to techniques and apparatuses for communicating an indication of mobile station support for candidate kernels for digital post distortion operations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a mobile station includes transmitting, by the mobile station, an indication of support for one or more candidate kernels for digital post distortion (DPoD) operations; and receiving, by the mobile station, a downlink communication based at least in part on the indication of support for the one or more candidate kernels for DPoD operations.

In some aspects, a method of wireless communication performed by a base station includes receiving, by the base station, an indication of support for one or more candidate kernels for DPoD operations; and transmitting, by the base station, a downlink communication based at least in part on the indication of support for the one or more candidate kernels for DPoD operations.

In some aspects, a mobile station for wireless communication includes a memory and one or more processors, coupled to the memory, configured to: transmit an indication of support for one or more candidate kernels for DPoD operations; and receive a downlink communication based at least in part on the indication of support for the one or more candidate kernels for DPoD operations.

In some aspects, a base station for wireless communication includes a memory and one or more processors, coupled to the memory, configured to: receive an indication of support for one or more candidate kernels for DPoD operations; and transmit a downlink communication based at least in part on the indication of support for the one or more candidate kernels for DPoD operations.

In some aspects, a non-transitory computer-readable medium storing a set of instructions for wireless communication includes one or more instructions that, when executed by one or more processors of a mobile station, cause the mobile station to: transmit an indication of support for one or more candidate kernels for DPoD operations; and receive a downlink communication based at least in part on the indication of support for the one or more candidate kernels for DPoD operations.

In some aspects, a non-transitory computer-readable medium storing a set of instructions for wireless communication includes one or more instructions that, when executed by one or more processors of a base station, cause the base station to: receive an indication of support for one or more candidate kernels for DPoD operations; and transmit a downlink communication based at least in part on the indication of support for the one or more candidate kernels for DPoD operations.

In some aspects, an apparatus for wireless communication includes means for transmitting an indication of support for one or more candidate kernels for DPoD operations; and means for receiving a downlink communication based at least in part on the indication of support for the one or more candidate kernels for DPoD operations.

In some aspects, an apparatus for wireless communication includes means for receiving an indication of support for one or more candidate kernels for DPoD operations; and means for transmitting a downlink communication based at least in part on the indication of support for the one or more candidate kernels for DPoD operations.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
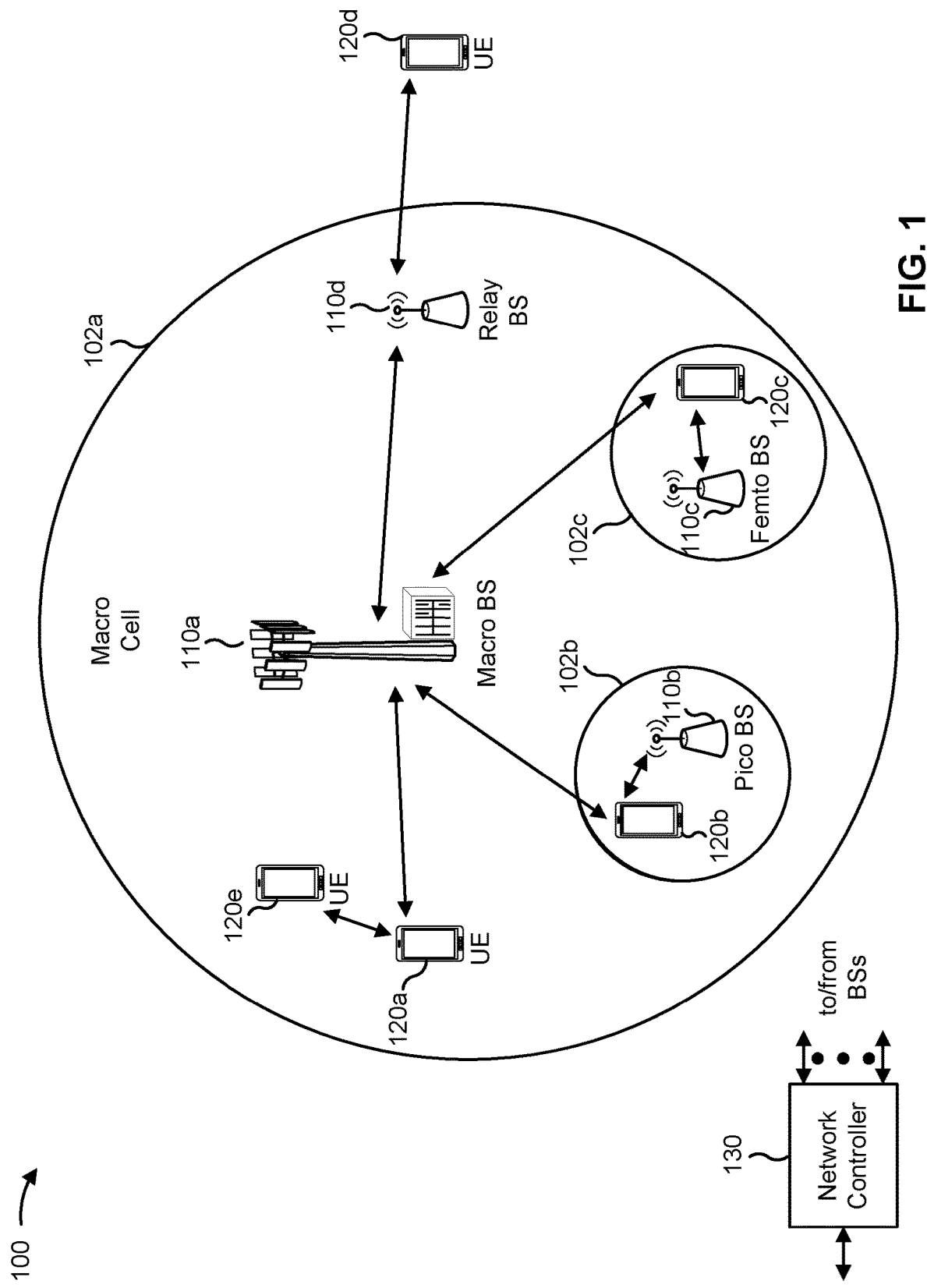
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
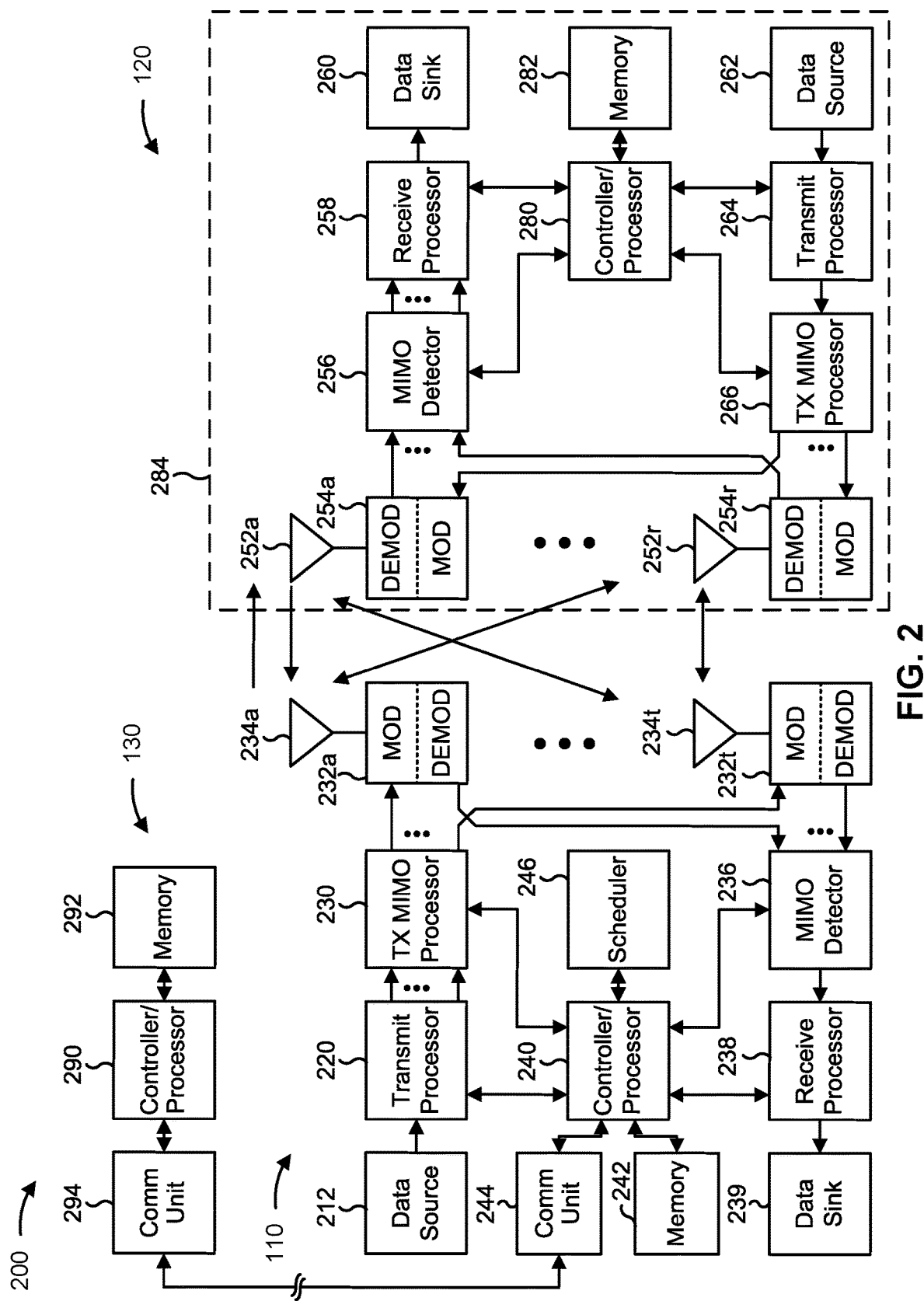
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-6).

Controller/processor 240 of base station 110, controller/processor 280 of UE 120, and/or any other component(s) of FIG. 2 may perform one or more techniques associated with communicating an indication of mobile station support for candidate kernels for digital post distortion operations, as described in more detail elsewhere herein. In some aspects, the mobile station described herein is the UE 120, is included in the UE 120, or includes one or more components of the UE 120 shown in FIG. 2.

Figure 5:
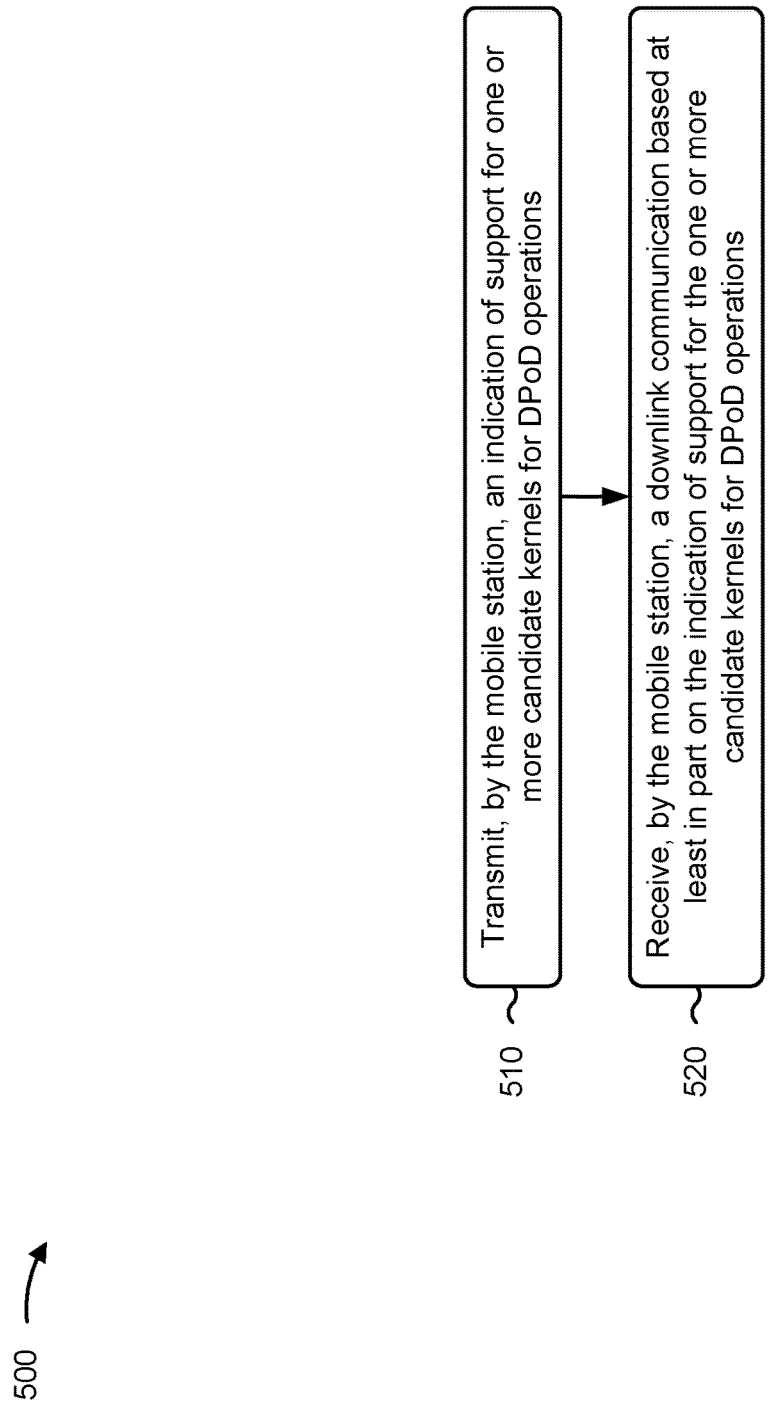
FIGS. 5 and 6 are diagrams illustrating example processes associated with communicating an indication of mobile station support for candidate kernels for digital post distortion operations, in accordance with the present disclosure.
Figure 6:
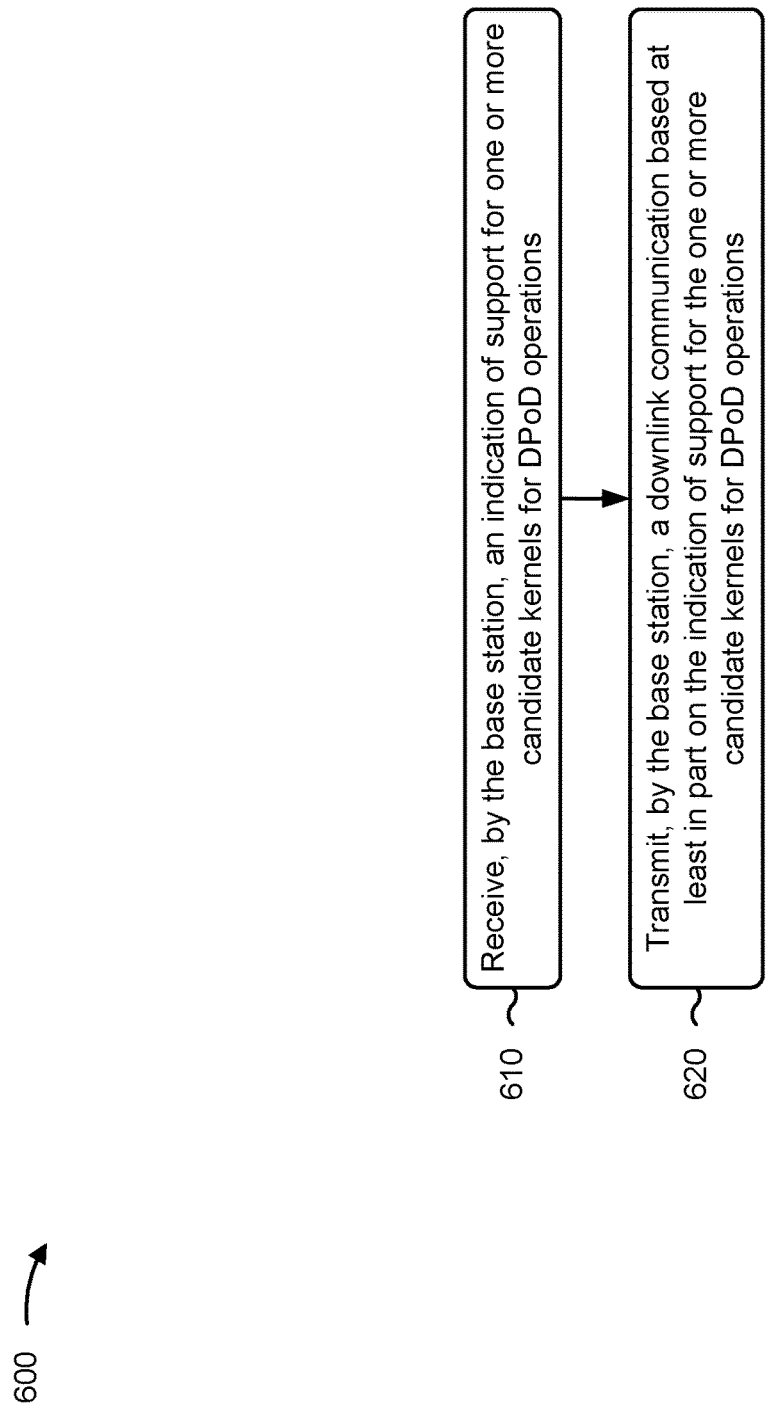

Controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the mobile station includes means for transmitting, by the mobile station, an indication of support for one or more candidate kernels for DPoD operations; and/or means for receiving, by the mobile station, a downlink communication based at least in part on the indication of support for the one or more candidate kernels for DPoD operations. In some aspects, the means for the mobile station to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the mobile station includes means for transmitting the indication of support via a periodic transmission of the indication of support, and/or means for transmitting the indication of support via an aperiodic transmission of the indication of support.

In some aspects, the mobile station includes means for transmitting the indication of support for the one or more candidate kernels for DPoD operations via radio resource control signaling, and/or means for transmitting the indication of support for the one or more candidate kernels for DPoD operations via one or more of uplink control information or a medium access control control element.

In some aspects, the mobile station includes means for receiving an indication of a selected set of candidate kernels for the downlink communication, wherein the selected set of candidate kernels is based at least in part on the indication of support for the one or more candidate kernels.

In some aspects, the mobile station includes means for receiving the indication via one or more of downlink control information or a medium access control control element.

In some aspects, the mobile station includes means for receiving the downlink communication having a compressed waveform based at least in part on the indication of support for the one or more candidate kernels for DPoD operations.

In some aspects, the base station includes means for receiving, by the base station, an indication of support for one or more candidate kernels for DPoD operations; and/or means for transmitting, by the base station, a downlink communication based at least in part on the indication of support for the one or more candidate kernels for DPoD operations. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for receiving the indication of support via a periodic transmission of the indication of support, and/or means for receiving the indication of support via an aperiodic transmission of the indication of support.

In some aspects, the base station includes means for receiving the indication of support for the one or more candidate kernels for DPoD operations via radio resource control signaling, and/or means for receiving the indication of support for the one or more candidate kernels for DPoD operations via one or more of uplink control information or a medium access control control element.

In some aspects, the base station includes means for transmitting an indication of a selected set of candidate kernels for the downlink communication, wherein the selected set of candidate kernels is based at least in part on the indication of support for the one or more candidate kernels.

In some aspects, the base station includes means for receiving the indication via one or more of downlink control information or a medium access control control element.

In some aspects, the base station includes means for receiving the downlink communication having a compressed waveform based at least in part on the indication of support for the one or more candidate kernels for DPoD operations.

\While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
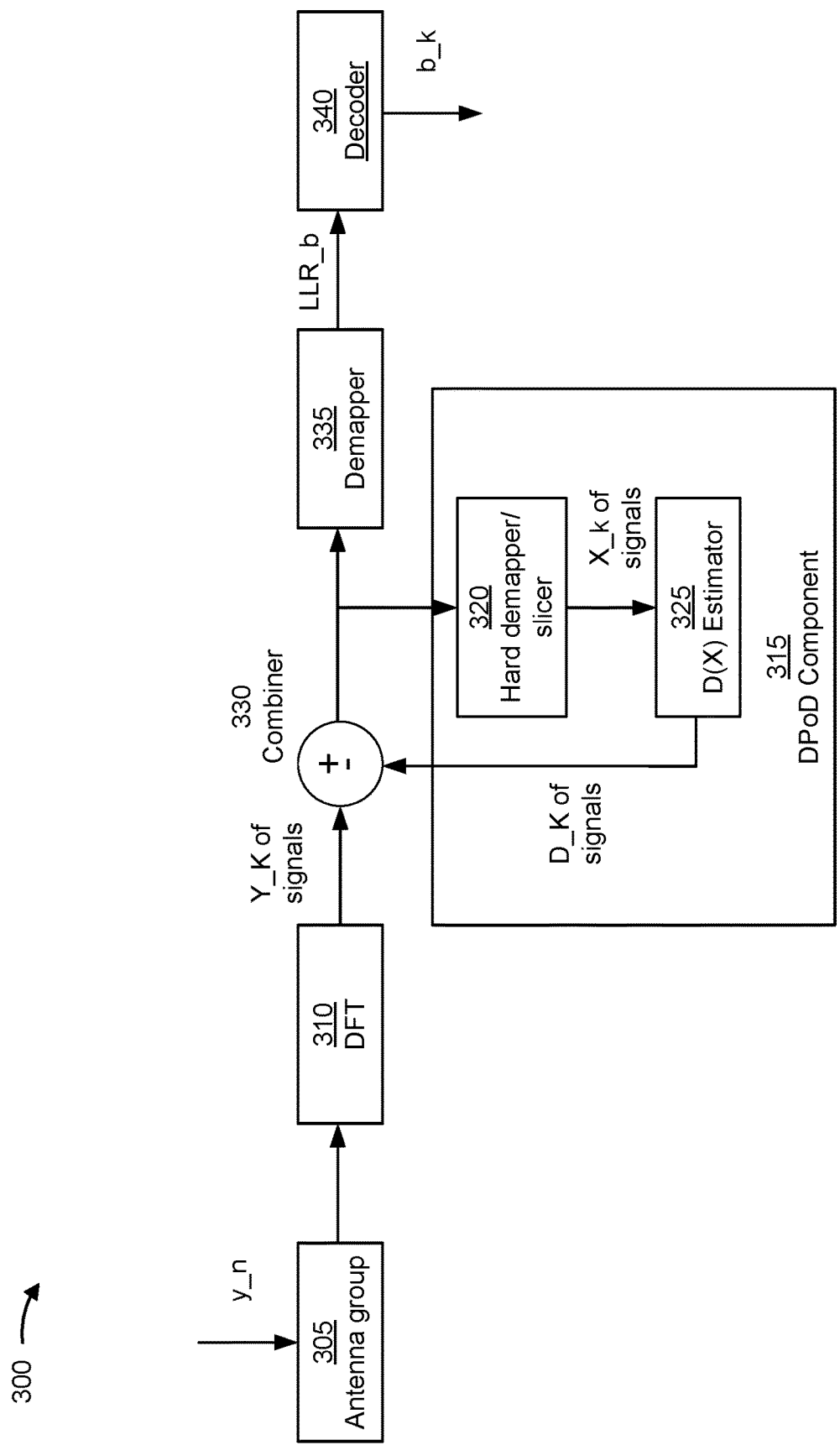
FIG. 3 is a diagram illustrating an example of a digital post distortion process performed by a receiver device, in accordance with the present disclosure

FIG. 3 is a diagram illustrating an example 300 of a digital post distortion process performed by a receiver device, in accordance with the present disclosure. For example, a receiver device (e.g., a mobile station) may receive a downlink communication, carried on signals, from a transmitter device (e.g., a base station). In some networks, the transmitter device may transmit signals with increasing non-linearity as power amplification increases. For example, a power amplifier (PA) of the transmitter device may distort a signal as a result of a relatively high peak to average power ratio (PAPR). The receiver may perform a DPoD process to correct for (e.g., estimate and/or remove) non-linear noise and address clipping issues that may arise as a result of the increased non-linearity introduced by power amplification.

As shown in example 300, an antenna group component 305 may receive one or more signals (e.g., y_n) that are mapped to resources in a time domain and a frequency domain. Discrete Fourier transform (DFT) component 310 may be used to transform the signals into frequency domain signals (e.g., Y_K). After DFT, the receiver device may perform the DPoD process on the process to remove non-linear noise from the signals.

The receiver device may perform the DPoD process iteratively, where in each iteration, a DPoD component 15 may perform hard decision slicing (e.g., using hard demapper/slicer component 320). Hard decision slicing uses sliced symbols in the frequency domain (e.g., Y_K) to reconstruct the time domain signal (e.g., an estimation of the time domain signal) as generated by the transmitter device before power amplification. The reconstructed time domain signal (e.g., X_k) is then passed through a non-linear model (e.g., D(X) estimator component 325) to estimate and or correct for non-linearity of the time domain signal and produce an estimated non-linearity of the time domain signal (e.g., D_K).

The non-linear model may use a variety of kernels to estimate the non-linearity of the reconstructed time domain signal. In each iteration of the DPoD process, a kernel or set of kernels may be used to estimate the non-linearity of the reconstructed time domain signal. For example, memory-less kernels (e.g., kernels that act on samples without using prior iteration/timing data), such as $x*|x|^2$ and/or $x*|x|^4$, among other examples, may be used to estimate non-linearity. In some situations, (e.g., large bandwidth, high signal-to-noise ratio (SNR)), the non-linear model may use memory kernels (e.g., kernels that use a mixture of different time samples), such as $x[n]*|x[n-k]|^M$, where x is a sample of the signal, n is a timestamp, k is a delay value, and M is an integer. Other kernels may also be used, such as $x_n^2 \cdot x^*_{n-1}$, and/or $|x_n| \cdot x_{n+1}$, among other examples.

The estimated non-linearity (e.g., D_K) may then be removed (e.g., subtracted) from the time domain signal (e.g., Y_K) by combiner component 330. After estimating and removing non-linearity (e.g., non-linear noise, or error), the DPoD process may proceed with further iterations or continue with signal demapping and decoding. For example, the receiver device may demap output from the combiner 330 (e.g., using demapper component 335) to generate a log-likelihood ratio (LLR) demapped signal (e.g., LLR_ b) that has been corrected power amplifier (PA) nonlinearity. A decider 340 of the receiver may decode the demapped signal to generate a payload of the signal (b_k).

However, the estimation process (e.g., applying the non-linear model using a kernel on the pre-power amplified time domain reconstructed signal) may be computationally expensive. In some wireless networks, a base station may be limited in an amount of PA compression (e.g., compression of downlink communication waveform) based at least in part on a standard set of kernels that all mobile stations support. However, this may limit an amount of compression and/or an amount of power saving that may otherwise be gained based at least in part on using a higher PA compression that is supported by a mobile station.

As indicated above, FIG. 3 is provided as an example. Other examples may differ from what is described with respect to FIG. 3.

In some aspects described herein, a mobile station may determine support for one or more candidate kernels that may be used for DPoD operations. For example, the mobile station may determine support for kernels based at least in part on kernel type (e.g., memory-based or memoryless, among other examples) and/or kernel order, among other examples. The mobile station may indicate, to a base station, the support for the kernels. The base station may then apply PA compression to a downlink communication, with the PA compression being associated with the kernels supported by the mobile station to perform DPoD on the downlink communication (e.g., to decompress the signaling of the downlink communication). In this way, the base station may conserve network resources and/or power resources based at least in part on increasing a PA compression when supported by the mobile station.

Figure 4:
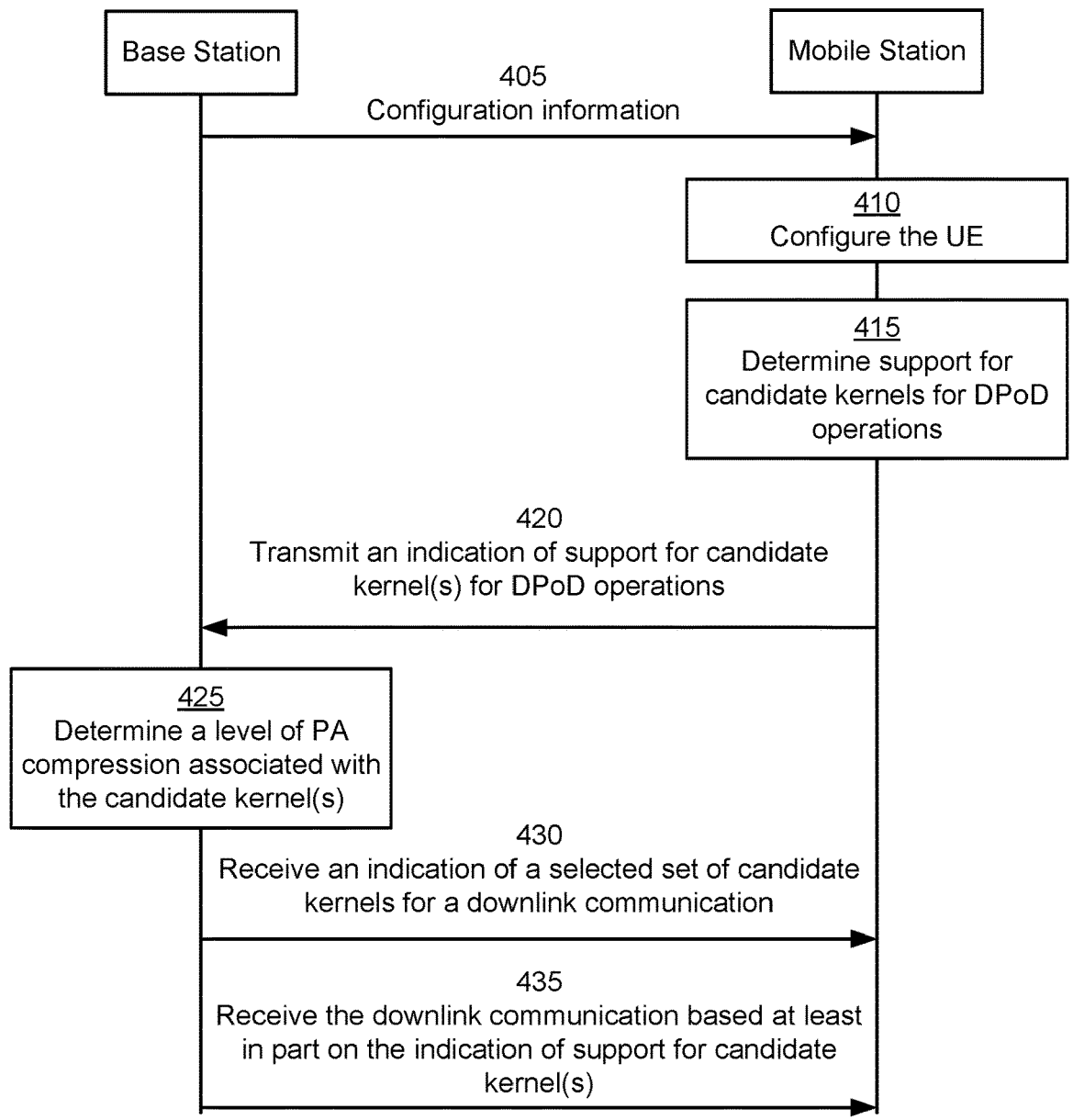
FIG. 4 is a diagram illustrating an example associated with communicating an indication of mobile station support for candidate kernels for digital post distortion operations, in accordance with the present disclosure.

FIG. 4 is a diagram illustrating an example 400 associated with communicating an indication of mobile station support for candidate kernels for digital post distortion operations, in accordance with the present disclosure. As shown in FIG. 4, a mobile station (e.g., UE 120) may communicate with a base station (e.g., base station 110). The mobile station and the base station may be part of a wireless network (e.g., wireless network 100).

As shown by reference number 405, the mobile station may receive configuration information (e.g., from the base station, another base station, and/or the like) and/or may determine the configuration information based at least in part on a communication protocol. In some aspects, the mobile station may receive the configuration information via one or more of radio resource control (RRC) signaling, MAC control elements (MAC CEs), downlink control information (DCI), and/or the like. In some aspects, the configuration information may include an indication of one or more configuration parameters (e.g., already known to the mobile station) for selection by the mobile station, and/or explicit configuration information for the mobile station to use to configure the mobile station, among other examples.

In some aspects, the configuration information may indicate that the mobile station is to transmit an indication of support for one or more candidate kernels for DPoD operations. For example, the configuration information may indicate that the mobile station is to transmit an indication of support for one or more types of kernels (e.g., memory-based kernels or memoryless kernels, among other examples), orders of kernels supported by the mobile station, a set of kernels supported, and/or a number of kernels supported (e.g., as candidates) for a single downlink communication, among other examples. In some aspects, the configuration information may indicate that the mobile station is to receive an indication of a selected set of candidate kernels for a downlink communication. In some aspects, the configuration information may indicate that the mobile station is to receive the downlink communication based at least in part on the indication of support for the one or more candidate kernels.

As shown by reference number 410, the mobile station may configure the mobile station for communicating with the base station. In some aspects, the mobile station may configure the mobile station based at least in part on the configuration information. In some aspects, the mobile station may be configured to perform one or more operations described herein. In some aspects, the mobile station may transmit a capabilities report to the base station. For example, the capabilities report may indicate whether the mobile station may support DPoD operations.

As shown by reference number 415, the mobile station may determine support for one or more candidate kernels for DPoD operations. In some aspects, the mobile station may determine support for the one or more candidate kernels based at least in part on the configuration information indicating that the mobile station is to perform a DPoD operation on received signals and/or based at least in part on the configuration information indicating that the mobile station is to transmit an indication of candidate kernels supported by the mobile station for DPoD operations.

In some aspects, the mobile station may determine support for the one or more candidate kernels for DPoD operations based at least in part on available resources of the mobile station, such as available computing resources of the mobile station and/or available power resources of the mobile station (e.g., based at least in part on a power condition such as charge level, a power condition such as being in a charging state, or a selected power mode such as a power saving mode, among other examples). In some aspects, the mobile station may determine support for the one or more candidate kernels for DPoD operations based at least in part on communication-based parameters, such as a number of active component carriers associated with the mobile station (e.g., for communication with the base station, another base station, or another device), a number of spatial division multiplexing streams associated with the mobile station, and/or channel conditions associated with the downlink communication.

In some aspects, the mobile station may determine support for the one or more candidate kernels for DPoD operations based at least in part on kernel types of the one or more candidate kernels. For example, the mobile station may determine support for memory-based kernels, memoryless kernels, or both.

In some aspects, the mobile station may determine support for the one or more candidate kernels for DPoD operations based at least in part on complexity and/or orders of the kernels. For example, the mobile station may determine support for kernels having an order (e.g., based at least in part on a highest value exponent of the kernels) that satisfies a threshold.

In some aspects, the mobile station may determine support for the one or more candidate kernels for DPoD operations based at least in part on multiple parameters, such as kernel types and/or orders of the kernels. For example, the mobile station may determine support for a first set of kernels (e.g., having an order that satisfies a first threshold) that are memoryless and/or a second set of kernels (e.g., having an order that satisfies a first threshold) that are memory-based, among other examples.

As shown by reference number 420, the mobile station may transmit, and the base station may receive, an indication of support for one or more candidate kernels for DPoD operations. In some aspects, the mobile station may transmit the indication of support via a periodic transmit of the indication of support or via an aperiodic transmit of the indication of support. In some aspects, the mobile station may transmit the indication of support via RRC signaling and/or via MAC layer signaling (e.g., one or more MAC CEs).

In some aspects, the indication of support may include an indication of whether the mobile station supports memory-based kernels and/or an indication of whether the mobile station supports memoryless kernels, among other examples. In some aspects, the indication of support may include an indication of support for a set of candidate kernels for selection by a base station. In other words, the indication of support may indicate multiple kernels that would be acceptable to the mobile station for performing a DPoD operation (e.g., based at least in part on computing and/or power resources, and/or latency requirements for decoding an associated downlink communication).

In some aspects, the indication of support may indicate a number of kernels supported for reception of the downlink communication. In other words, the indication of support may include an indication of a number of candidate kernels that may be indicated as a candidate kernel for a particular downlink communication. For example, the mobile station may indicate support for kernels 1 through 19. However, the mobile station may only support 7 candidate kernels that the mobile station can apply to a particular downlink communication for the mobile station to satisfy a computing and/or power resource parameter and/or to satisfy a latency requirement for the particular downlink communication.

In some aspects, the indication of support may indicate a number of a first set of kernels (e.g., based at least in part on being memoryless or memory-based, or based at least in part on orders of the kernels) and/or a second set of kernels supported for reception of the downlink communication. For example, the mobile station may indicate support for 10 candidate kernels (having orders that satisfy a threshold order) that the mobile station can apply to a particular downlink communication and/or may indicate support for 5 candidate kernels (having orders that fail to satisfy the threshold order) that the mobile station can apply to the particular downlink communication.

As shown by reference number 425, the base station may determine a level of PA compression associated with the one or more candidate kernels. In some aspects, the base station my determine the PA compression associated with the one or more candidate kernels based at least in part on the indication of support for the one or more candidate kernels for DPoD. In some aspects, the base station may determine to use a highest level of PA compression (e.g., to generate a gain in transmission of the downlink communication and/or to allow for power saving, among other examples) that is supported by the mobile station for DPoD. Support by the mobile station for DPoD may be based at least in part on the support for the one or more candidate kernels for DPoD.

As shown by reference number 430, the base station may transmit, and the mobile station may receive, and an indication of a selected set of candidate kernels for a downlink communication. In some aspects, the selected set of candidate kernels may be based at least in part on the indication of support for the one or more candidate kernels. For example, the selected set of candidate kernels may include some or all of the one or more candidate kernels. In some aspects, the base station may not transmit an indication of the selected set of candidate kernels for the downlink communication and/or the mobile station may be configured to assume that the base station has agreed to use the one or more candidate kernels for which the mobile station indicated support.

As shown by reference number 435, the base station may transmit, and the mobile station may receive, the downlink communication based at least in part on the indication of support for the one or more candidate kernels. In some aspects, the downlink communication may have a compressed waveform. For example, the base station may transmit the downlink communication with the compressed waveform that is based at least in part on the selected set of candidate kernels, and/or the indication of support for the one or more candidate kernels for DPoD operations.

Based at least in part on the mobile station indicating support for the one or more kernels, the base station may apply PA compression to a downlink communication, with the PA compression being associated with the kernels supported by the mobile station to perform DPoD on the downlink communication (e.g., to decompress the signaling of the downlink communication). In this way, the base station may conserve network resources and/or power resources based at least in part on increasing a PA compression when supported by the mobile station.

As indicated above, FIG. 4 is provided as an example. Other examples may differ from what is described with respect to FIG. 4.

FIG. 5 is a diagram illustrating an example process 500 performed, for example, by a mobile station, in accordance with the present disclosure. Example process 500 is an example where the mobile station (e.g., UE 120) performs operations associated with indication of mobile station support for candidate kernels for DPoD operations.

As shown in FIG. 5, in some aspects, process 500 may include transmitting an indication of support for one or more candidate kernels for DPoD operations (block 510). For example, the mobile station (e.g., using transmission component 704, depicted in FIG. 7) may transmit an indication of support for one or more candidate kernels for DPoD operations, as described above.

As further shown in FIG. 5, in some aspects, process 500 may include receiving a downlink communication based at least in part on the indication of support for the one or more candidate kernels for DPoD operations (block 520). For example, the mobile station (e.g., using reception component 702, depicted in FIG. 7) may receive a downlink communication based at least in part on the indication of support for the one or more candidate kernels for DPoD operations, as described above.

Process 500 may include additional aspects, such as any single aspect or any combination of aspects described below and/or in connection with one or more other processes described elsewhere herein.

In a first aspect, the indication of support for the one or more candidate kernels for DPoD operations comprises one or more of: an indication of whether the mobile station supports memory-based kernels, or an indication of whether the mobile station supports memoryless kernels.

In a second aspect, alone or in combination with the first aspect, the indication of support for the one or more candidate kernels for DPoD operations comprises one or more of: an indication of support for a set of candidate kernels for selection by a base station, or an indication of a number of kernels supported for reception of the downlink communication.

In a third aspect, alone or in combination with one or more of the first and second aspects, the indication of the number of kernels supported for reception of the downlink communication comprises one or more of: a number of kernels having orders that satisfy a threshold order that is supported for reception of the downlink communication, or a number of kernels having orders that fail to satisfy the threshold order that is supported for reception of the downlink communication.

In a fourth aspect, alone or in combination with one or more of the first through third aspects, the indication of the number of kernels supported for reception of the downlink communication comprises one or more of: a number of memory-based kernels that is supported for reception of the downlink communication, or a number of memoryless kernels that is supported for reception of the downlink communication.

In a fifth aspect, alone or in combination with one or more of the first through fourth aspects, transmitting the indication of support for the one or more candidate kernels for DPoD operations comprises one or more of: transmitting the indication of support via a periodic transmission of the indication, or transmitting the indication of support via an aperiodic transmission of the indication of support.

In a sixth aspect, alone or in combination with one or more of the first through fifth aspects, transmitting the indication of support for the one or more candidate kernels for DPoD operations comprises transmitting the indication of support based at least in part on one or more of: available computing resources of the mobile station, available power resources of the mobile station, a number of active component carriers associated with the mobile station, a number of spatial division multiplexing streams associated with the mobile station, or channeling conditions associated with the downlink communication.

In a seventh aspect, alone or in combination with one or more of the first through sixth aspects, transmitting the indication of support for the one or more candidate kernels for DPoD operations comprises one or more of: transmitting the indication of support for the one or more candidate kernels for DPoD operations via radio resource control signaling, or transmitting the indication of support for the one or more candidate kernels for DPoD operations via one or more of uplink control information or a MAC CE.

In an eighth aspect, alone or in combination with one or more of the first through seventh aspects, process 500 includes receiving an indication of a selected set of candidate kernels for the downlink communication, wherein the selected set of candidate kernels is based at least in part on the indication of support for the one or more candidate kernels.

In a ninth aspect, alone or in combination with one or more of the first through eighth aspects, receiving the indication of the selected set of candidate kernels for the downlink communication comprises receiving the indication via one or more of DCI or a MAC CE.

In a tenth aspect, alone or in combination with one or more of the first through ninth aspects, receiving the downlink communication based at least in part on the indication of support for the one or more candidate kernels for DPoD operations comprises receiving the downlink communication having a compressed waveform based at least in part on the indication of support for the one or more candidate kernels for DPoD operations.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a diagram illustrating an example process 600 performed, for example, by a base station, in accordance with the present disclosure. Example process 600 is an example where the base station (e.g., base station 110) performs operations associated with indication of mobile station support for candidate kernels for digital post distortion operations.

As shown in FIG. 6, in some aspects, process 600 may include receiving an indication of support for one or more candidate kernels for DPoD operations (block 610). For example, the base station (e.g., using reception component 802, depicted in FIG. 8) may receive an indication of support for one or more candidate kernels for DPoD operations, as described above.

As further shown in FIG. 6, in some aspects, process 600 may include transmitting a downlink communication based at least in part on the indication of support for the one or more candidate kernels for DPoD operations (block 620). For example, the base station (e.g., using transmission component 804, depicted in FIG. 8) may transmit a downlink communication based at least in part on the indication of support for the one or more candidate kernels for DPoD operations, as described above.

Process 600 may include additional aspects, such as any single aspect or any combination of aspects described below and/or in connection with one or more other processes described elsewhere herein.

In a first aspect, the indication of support for the one or more candidate kernels for DPoD operations comprises one or more of: an indication of whether a mobile station supports memory-based kernels, or an indication of whether the mobile station supports memoryless kernels.

In a second aspect, alone or in combination with the first aspect, the indication of support for the one or more candidate kernels for DPoD operations comprises one or more of: an indication of support for a set of candidate kernels for selection by the base station, or an indication of a number of kernels supported for reception of the downlink communication.

In a third aspect, alone or in combination with one or more of the first and second aspects, the indication of the number of kernels supported for reception of the downlink communication comprises one or more of: a number of kernels having orders that satisfy a threshold order that is supported for reception of the downlink communication, or a number of kernels having orders that fail to satisfy the threshold order that is supported for reception of the downlink communication.

In a fourth aspect, alone or in combination with one or more of the first through third aspects, the indication of the number of kernels supported for reception of the downlink communication comprises one or more of: a number of memory-based kernels that is supported for reception of the downlink communication, or a number of memoryless kernels that is supported for reception of the downlink communication.

In a fifth aspect, alone or in combination with one or more of the first through fourth aspects, receiving the indication of support for the one or more candidate kernels for DPoD operations comprises one or more of: receiving the indication of support via a periodic transmission of the indication of support, or receiving the indication of support via an aperiodic transmission of the indication of support.

In a sixth aspect, alone or in combination with one or more of the first through fifth aspects, receiving the indication of support for the one or more candidate kernels for DPoD operations comprises receiving the indication of support based at least in part on one or more of: available computing resources of a mobile station, available power resources of the mobile station, a number of active component carriers associated with the mobile station, a number of spatial division multiplexing streams associated with the mobile station, or channeling conditions associated with the downlink communication.

In a seventh aspect, alone or in combination with one or more of the first through sixth aspects, receiving the indication of support for the one or more candidate kernels for DPoD operations comprises one or more of: receiving the indication of support for the one or more candidate kernels for DPoD operations via radio resource control signaling, or receiving the indication of support for the one or more candidate kernels for DPoD operations via one or more of uplink control information or a medium access control control element.

In an eighth aspect, alone or in combination with one or more of the first through seventh aspects, process 600 includes transmitting an indication of a selected set of candidate kernels for the downlink communication, wherein the selected set of candidate kernels is based at least in part on the indication of support for the one or more candidate kernels.

In a ninth aspect, alone or in combination with one or more of the first through eighth aspects, receiving the indication of the selected set of candidate kernels for the downlink communication comprises receiving the indication via one or more of downlink control information or a medium access control control element.

In a tenth aspect, alone or in combination with one or more of the first through ninth aspects, receiving the downlink communication based at least in part on the indication of support for the one or more candidate kernels for DPoD operations comprises receiving the downlink communication having a compressed waveform based at least in part on the indication of support for the one or more candidate kernels for DPoD operations.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
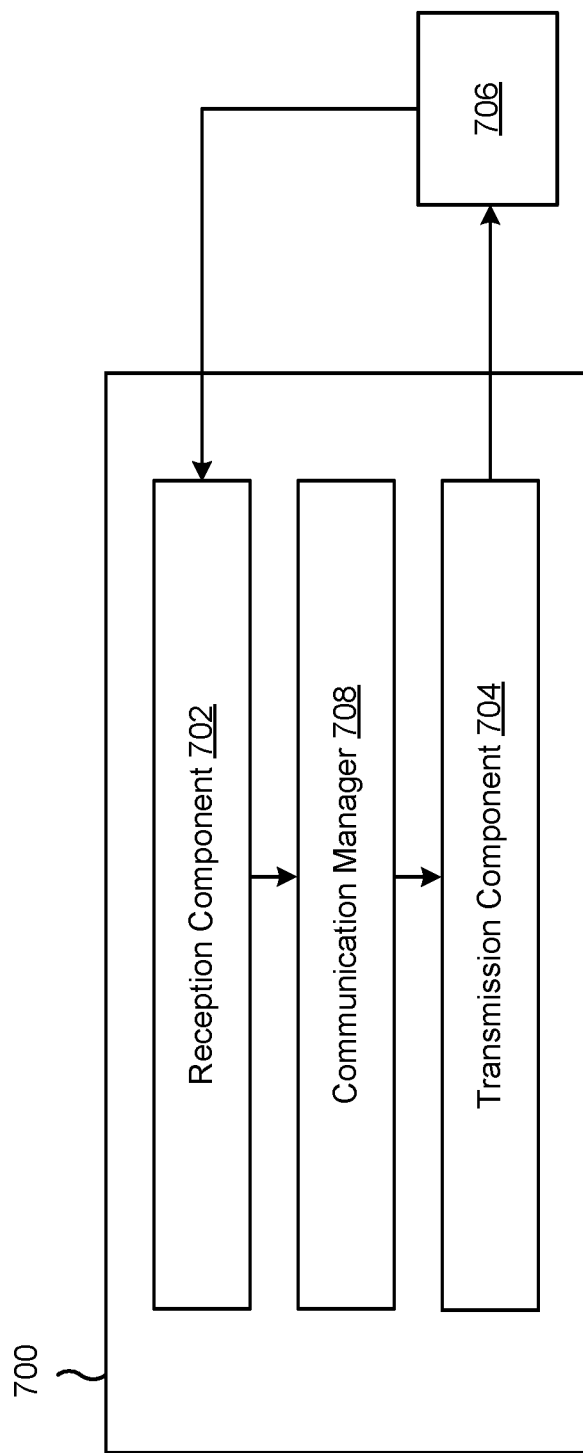
FIGS. 7 and 8 are block diagrams of example apparatuses for wireless communication, in accordance with the present disclosure.

FIG. 7 is a block diagram of an example apparatus 700 for wireless communication. The apparatus 700 may be a mobile station, or a mobile station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a communication manager 708.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the mobile station described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the mobile station described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the mobile station described above in connection with FIG. 2. In some aspects, the transmission component 704 may be co-located with the reception component 702 in a transceiver.

The transmission component 704 may transmit an indication of support for one or more candidate kernels for DPoD operations. The reception component 702 may receive a downlink communication based at least in part on the indication of support for the one or more candidate kernels for DPoD operations.

The reception component 702 may receive an indication of a selected set of candidate kernels for the downlink communication, wherein the selected set of candidate kernels is based at least in part on the indication of support for the one or more candidate kernels.

The communication manager 708 may manage communications between the apparatus 700 and the apparatus 706. For example, the communication manager 708 may configure one or more components of the apparatus 700 to form a beam for communication with the apparatus 706. In some aspects, the communication manager 708 may perform one or more determinations, based at least in part on received and/or measured information, for communicating with the apparatus 706.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
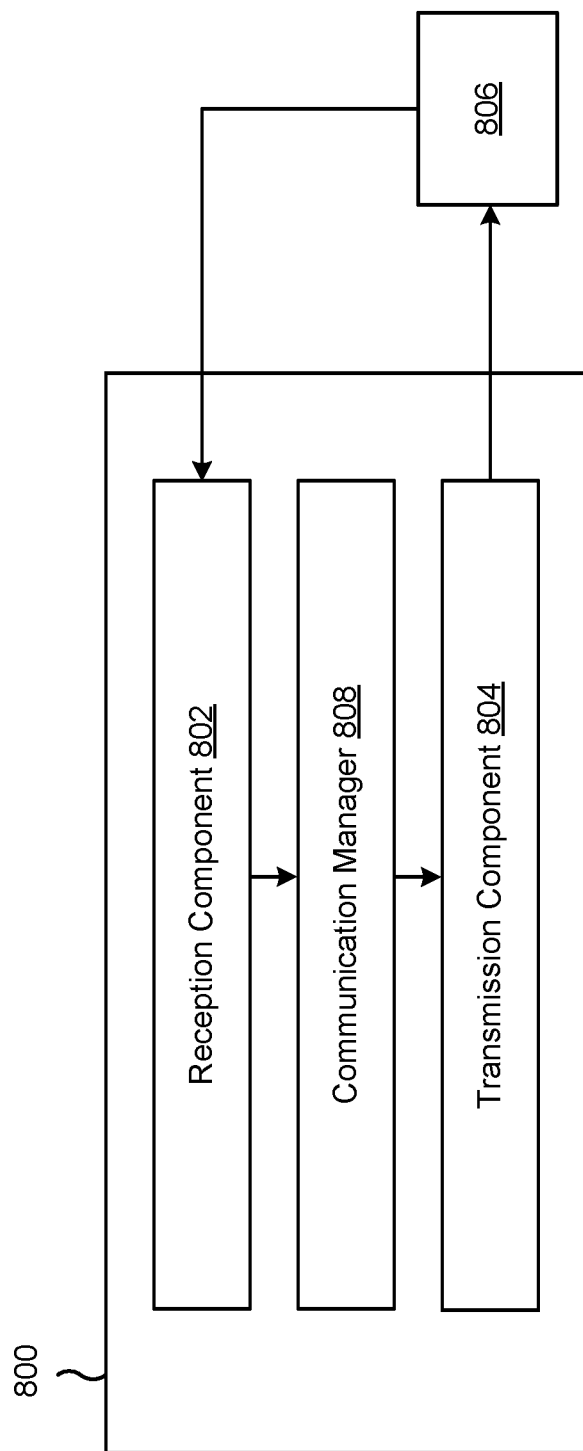

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The reception component 802 may receive an indication of support for one or more candidate kernels for DPoD operations. The transmission component 804 may transmit a downlink communication based at least in part on the indication of support for the one or more candidate kernels for DPoD operations.

The transmission component 804 may transmit an indication of a selected set of candidate kernels for the downlink communication, wherein the selected set of candidate kernels is based at least in part on the indication of support for the one or more candidate kernels.

The communication manager 808 may manage communications between the apparatus 800 and the apparatus 806. For example, the communication manager 808 may configure one or more components of the apparatus 800 to form a beam for communication with the apparatus 806. In some aspects, the communication manager 808 may perform one or more determinations, based at least in part on received and/or measured information, for communicating with the apparatus 806.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a mobile station, comprising: transmitting, by the mobile station, an indication of support for one or more candidate kernels for digital post distortion (DPoD) operations; and receiving, by the mobile station, a downlink communication based at least in part on the indication of support for the one or more candidate kernels for DPoD operations.

Aspect 2: The method of Aspect 1, wherein the indication of support for the one or more candidate kernels for DPoD operations comprises one or more of: an indication of whether the mobile station supports memory-based kernels, or an indication of whether the mobile station supports memoryless kernels.

Aspect 3: The method of any of Aspects 1-2, wherein the indication of support for the one or more candidate kernels for DPoD operations comprises one or more of: an indication of support for a set of candidate kernels for selection by a base station, or an indication of a number of kernels supported for reception of the downlink communication.

Aspect 4: The method of Aspect 3, wherein the indication of the number of kernels supported for reception of the downlink communication comprises one or more of: a number of kernels having orders that satisfy a threshold order that is supported for reception of the downlink communication, or a number of kernels having orders that fail to satisfy the threshold order that is supported for reception of the downlink communication.

Aspect 5: The method of Aspect 3, wherein the indication of the number of kernels supported for reception of the downlink communication comprises one or more of: a number of memory-based kernels that is supported for reception of the downlink communication, or a number of memoryless kernels that is supported for reception of the downlink communication.

Aspect 6: The method of any of Aspects 1-5, wherein transmitting the indication of support for the one or more candidate kernels for DPoD operations comprises one or more of: transmitting the indication of support via a periodic transmission of the indication of support, or transmitting the indication of support via an aperiodic transmission of the indication of support.

Aspect 7: The method of any of Aspects 1-6, wherein transmitting the indication of support for the one or more candidate kernels for DPoD operations comprises transmitting the indication of support based at least in part on one or more of: available computing resources of the mobile station, available power resources of the mobile station, a number of active component carriers associated with the mobile station, a number of spatial division multiplexing streams associated with the mobile station, or channel conditions associated with the downlink communication.

Aspect 8: The method of any of Aspects 1-7, wherein transmitting the indication of support for the one or more candidate kernels for DPoD operations comprises one or more of: transmitting the indication of support for the one or more candidate kernels for DPoD operations via radio resource control signaling, or transmitting the indication of support for the one or more candidate kernels for DPoD operations via one or more of uplink control information or a medium access control control element.

Aspect 9: The method of any of Aspects 1-8, further comprising: receiving an indication of a selected set of candidate kernels for the downlink communication, wherein the selected set of candidate kernels is based at least in part on the indication of support for the one or more candidate kernels.

Aspect 10: The method of Aspect 9, wherein receiving the indication of the selected set of candidate kernels for the downlink communication comprises: receiving the indication via one or more of downlink control information or a medium access control control element.

Aspect 11: The method of any of Aspects 1-10, wherein receiving the downlink communication based at least in part on the indication of support for the one or more candidate kernels for DPoD operations comprises: receiving the downlink communication having a compressed waveform based at least in part on the indication of support for the one or more candidate kernels for DPoD operations.

Aspect 12: A method of wireless communication performed by a base station, comprising: receiving, by the base station, an indication of support for one or more candidate kernels for digital post distortion (DPoD) operations; and transmitting, by the base station, a downlink communication based at least in part on the indication of support for the one or more candidate kernels for DPoD operations.

Aspect 13: The method of Aspect 12, wherein the indication of support for the one or more candidate kernels for DPoD operations comprises one or more of: an indication of whether a mobile station supports memory-based kernels, or an indication of whether the mobile station supports memoryless kernels.

Aspect 14: The method of any of Aspects 12-13, wherein the indication of support for the one or more candidate kernels for DPoD operations comprises one or more of: an indication of support for a set of candidate kernels for selection by the base station, or an indication of a number of kernels supported for reception of the downlink communication.

Aspect 15: The method of Aspect 14, wherein the indication of the number of kernels supported for reception of the downlink communication comprises one or more of: a number of kernels having orders that satisfy a threshold order that is supported for reception of the downlink communication, or a number of kernels having orders that fail to satisfy the threshold order that is supported for reception of the downlink communication.

Aspect 16: The method of Aspect 14, wherein the indication of the number of kernels supported for reception of the downlink communication comprises one or more of: a number of memory-based kernels that is supported for reception of the downlink communication, or a number of memoryless kernels that is supported for reception of the downlink communication.

Aspect 17: The method of any of Aspects 12-16, wherein receiving the indication of support for the one or more candidate kernels for DPoD operations comprises one or more of: receiving the indication of support via a periodic transmission of the indication of support, or receiving the indication of support via an aperiodic transmission of the indication of support.

Aspect 18: The method of any of Aspects 12-17, wherein receiving the indication of support for the one or more candidate kernels for DPoD operations comprises receiving the indication of support based at least in part on one or more of: available computing resources of a mobile station, available power resources of the mobile station, a number of active component carriers associated with the mobile station, a number of spatial division multiplexing streams associated with the mobile station, or channel conditions associated with the downlink communication.

Aspect 19: The method of any of Aspects 12-18, wherein receiving the indication of support for the one or more candidate kernels for DPoD operations comprises one or more of: receiving the indication of support for the one or more candidate kernels for DPoD operations via radio resource control signaling, or receiving the indication of support for the one or more candidate kernels for DPoD operations via one or more of uplink control information or a medium access control control element.

Aspect 20: The method of any of Aspects 12-19, further comprising: transmitting an indication of a selected set of candidate kernels for the downlink communication, wherein the selected set of candidate kernels is based at least in part on the indication of support for the one or more candidate kernels.

Aspect 21: The method of Aspect 20, wherein receiving the indication of the selected set of candidate kernels for the downlink communication comprises: receiving the indication via one or more of downlink control information or a medium access control control element.

Aspect 22: The method of any of Aspects 12-21, wherein receiving the downlink communication based at least in part on the indication of support for the one or more candidate kernels for DPoD operations comprises: receiving the downlink communication having a compressed waveform based at least in part on the indication of support for the one or more candidate kernels for DPoD operations.

Aspect 23: An apparatus for wireless communication at a device, comprising a processor; memory coupled with the processor; and instructions stored in the memory and executable by the processor to cause the apparatus to perform the method of one or more Aspects of Aspects 1-22.

Aspect 24: A device for wireless communication, comprising a memory and one or more processors coupled to the memory, the memory and the one or more processors configured to perform the method of one or more Aspects of Aspects 1-22.

Aspect 25: An apparatus for wireless communication, comprising at least one means for performing the method of one or more Aspects of Aspects 1-22.

Aspect 26: A non-transitory computer-readable medium storing code for wireless communication, the code comprising instructions executable by a processor to perform the method of one or more Aspects of Aspects 1-22.

Aspect 27: A non-transitory computer-readable medium storing a set of instructions for wireless communication, the set of instructions comprising one or more instructions that, when executed by one or more processors of a device, cause the device to perform the method of one or more Aspects of Aspects 1-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a mobile station, comprising:
    transmitting, by the mobile station, an indication of support for one or more candidate kernels for digital post distortion (DPoD) operations; and
    receiving, by the mobile station, a downlink communication based at least in part on the indication of support for the one or more candidate kernels for DPoD operations.

2. The method of claim 1, wherein the indication of support for the one or more candidate kernels for DPoD operations comprises one or more of:
    an indication of whether the mobile station supports memory-based kernels, or
    an indication of whether the mobile station supports memoryless kernels.

3. The method of claim 1, wherein the indication of support for the one or more candidate kernels for DPoD operations comprises one or more of:
    an indication of support for a set of candidate kernels for selection by a base station, or
    an indication of a number of kernels supported for reception of the downlink communication.

4. The method of claim 3, wherein the indication of the number of kernels supported for reception of the downlink communication comprises one or more of:
    a number of kernels having orders that satisfy a threshold order that is supported for reception of the downlink communication, or
    a number of kernels having orders that fail to satisfy the threshold order that is supported for reception of the downlink communication.

5. The method of claim 3, wherein the indication of the number of kernels supported for reception of the downlink communication comprises one or more of:
    a number of memory-based kernels that is supported for reception of the downlink communication, or
    a number of memoryless kernels that is supported for reception of the downlink communication.

6. The method of claim 1, wherein transmitting the indication of support for the one or more candidate kernels for DPoD operations comprises one or more of:
    transmitting the indication of support via a periodic transmission of the indication of support, or
    transmitting the indication of support via an aperiodic transmission of the indication of support.

7. The method of claim 1, wherein transmitting the indication of support for the one or more candidate kernels for DPoD operations comprises transmitting the indication of support based at least in part on one or more of:
    available computing resources of the mobile station,
    available power resources of the mobile station,
    a number of active component carriers associated with the mobile station,
    a number of spatial division multiplexing streams associated with the mobile station, or
    channel conditions associated with the downlink communication.

8. The method of claim 1, wherein transmitting the indication of support for the one or more candidate kernels for DPoD operations comprises one or more of:
    transmitting the indication of support for the one or more candidate kernels for DPoD operations via radio resource control signaling, or
    transmitting the indication of support for the one or more candidate kernels for DPoD operations via one or more of uplink control information or a medium access control control element.

9. The method of claim 1, further comprising:
    receiving an indication of a selected set of candidate kernels for the downlink communication,
        wherein the selected set of candidate kernels is based at least in part on the indication of support for the one or more candidate kernels.

10. The method of claim 9, wherein receiving the indication of the selected set of candidate kernels for the downlink communication comprises:
    receiving the indication via one or more of downlink control information or a medium access control control element.

11. The method of claim 1, wherein receiving the downlink communication based at least in part on the indication of support for the one or more candidate kernels for DPoD operations comprises:
    receiving the downlink communication having a compressed waveform based at least in part on the indication of support for the one or more candidate kernels for DPoD operations.

12. A method of wireless communication performed by a base station, comprising:
    receiving, by the base station, an indication of support for one or more candidate kernels for digital post distortion (DPoD) operations; and
    transmitting, by the base station, a downlink communication based at least in part on the indication of support for the one or more candidate kernels for DPoD operations.

13. The method of claim 12, wherein the indication of support for the one or more candidate kernels for DPoD operations comprises one or more of:
    an indication of whether a mobile station supports memory-based kernels, or
    an indication of whether the mobile station supports memoryless kernels.

14. The method of claim 12, wherein the indication of support for the one or more candidate kernels for DPoD operations comprises one or more of:
    an indication of support for a set of candidate kernels for selection by the base station, or
    an indication of a number of kernels supported for reception of the downlink communication.

15. The method of claim 14, wherein the indication of the number of kernels supported for reception of the downlink communication comprises one or more of:
    a number of kernels having orders that satisfy a threshold order that is supported for reception of the downlink communication, or a number of kernels having orders that fail to satisfy the threshold order that is supported for reception of the downlink communication.

16. The method of claim 14, wherein the indication of the number of kernels supported for reception of the downlink communication comprises one or more of:
   a number of memory-based kernels that is supported for reception of the downlink communication, or
   a number of memoryless kernels that is supported for reception of the downlink communication.

17. The method of claim 12, wherein receiving the indication of support for the one or more candidate kernels for DPoD operations comprises one or more of:
   receiving the indication of support via a periodic transmission of the indication of support, or
   receiving the indication of support via an aperiodic transmission of the indication of support.

18. The method of claim 12, wherein receiving the indication of support for the one or more candidate kernels for DPoD operations comprises receiving the indication of support based at least in part on one or more of:
   available computing resources of a mobile station,
   available power resources of the mobile station,
   a number of active component carriers associated with the mobile station,
   a number of spatial division multiplexing streams associated with the mobile station, or
   channel conditions associated with the downlink communication.

19. The method of claim 12, wherein receiving the indication of support for the one or more candidate kernels for DPoD operations comprises one or more of:
   receiving the indication of support for the one or more candidate kernels for DPoD operations via radio resource control signaling, or
   receiving the indication of support for the one or more candidate kernels for DPoD operations via one or more of uplink control information or a medium access control control element.

20. The method of claim 12, further comprising:
   transmitting an indication of a selected set of candidate kernels for the downlink communication,
      wherein the selected set of candidate kernels is based at least in part on the indication of support for the one or more candidate kernels.

21. The method of claim 20, wherein receiving the indication of the selected set of candidate kernels for the downlink communication comprises:
   receiving the indication via one or more of downlink control information or a medium access control control element.

22. The method of claim 12, wherein receiving the downlink communication based at least in part on the indication of support for the one or more candidate kernels for DPoD operations comprises:
   receiving the downlink communication having a compressed waveform based at least in part on the indication of support for the one or more candidate kernels for DPoD operations.

23. A mobile station for wireless communication, comprising:
   a memory; and
   one or more processors, coupled to the memory, configured to:
      transmit an indication of support for one or more candidate kernels for digital post distortion (DPoD) operations; and
      receive a downlink communication based at least in part on the indication of support for the one or more candidate kernels for DPoD operations.

24. The mobile station of claim 23, wherein the indication of support for the one or more candidate kernels for DPoD operations comprises one or more of:
   an indication of whether the mobile station supports memory-based kernels, or
   an indication of whether the mobile station supports memoryless kernels.

25. The mobile station of claim 23, wherein the indication of support for the one or more candidate kernels for DPoD operations comprises one or more of:
   an indication of support for a set of candidate kernels for selection by a base station, or
   an indication of a number of kernels supported for reception of the downlink communication.

26. The mobile station of claim 25, wherein the indication of the number of kernels supported for reception of the downlink communication comprises one or more of:
   a number of kernels having orders that satisfy a threshold order that is supported for reception of the downlink communication, or
   a number of kernels having orders that fail to satisfy the threshold order that is supported for reception of the downlink communication.

27. The mobile station of claim 25, wherein the indication of the number of kernels supported for reception of the downlink communication comprises one or more of:
   a number of memory-based kernels that is supported for reception of the downlink communication, or
   a number of memoryless kernels that is supported for reception of the downlink communication.

28. The mobile station of claim 23, wherein the one or more processors, to transmit the indication of support for the one or more candidate kernels for DPoD operations, are configured to:
   transmit the indication of support via a periodic transmission of the indication of support, or
   transmit the indication of support via an aperiodic transmission of the indication of support.

29. The mobile station of claim 23, wherein the one or more processors, to transmit the indication of support for the one or more candidate kernels for DPoD operations, are configured to transmit the indication of support based at least in part on one or more of:
   available computing resources of the mobile station,
   available power resources of the mobile station,
   a number of active component carriers associated with the mobile station,
   a number of spatial division multiplexing streams associated with the mobile station, or
   channel conditions associated with the downlink communication.

30. The mobile station of claim 23, wherein the one or more processors, to transmit the indication of support for the one or more candidate kernels for DPoD operations, are configured to:
   transmit the indication of support for the one or more candidate kernels for DPoD operations via radio resource control signaling, or
   transmit the indication of support for the one or more candidate kernels for DPoD operations via one or more of uplink control information or a medium access control control element.

31. The mobile station of claim 23, wherein the one or more processors are further configured to:
receive an indication of a selected set of candidate kernels for the downlink communication,
wherein the selected set of candidate kernels is based at least in part on the indication of support for the one or more candidate kernels.

32. The mobile station of claim 31, wherein the one or more processors, to receive the indication of the selected set of candidate kernels for the downlink communication, are configured to:
receive the indication via one or more of downlink control information or a medium access control control element.

33. The mobile station of claim 23, wherein the one or more processors, to receive the downlink communication based at least in part on the indication of support for the one or more candidate kernels for DPoD operations, are configured to:
receive the downlink communication having a compressed waveform based at least in part on the indication of support for the one or more candidate kernels for DPoD operations.

34. A base station for wireless communication, comprising:
a memory; and
one or more processors, coupled to the memory, configured to:
receive an indication of support for one or more candidate kernels for digital post distortion (DPoD) operations; and
transmit a downlink communication based at least in part on the indication of support for the one or more candidate kernels for DPoD operations.

35. The base station of claim 34, wherein the indication of support for the one or more candidate kernels for DPoD operations comprises one or more of:
an indication of whether a mobile station supports memory-based kernels, or
an indication of whether the mobile station supports memoryless kernels.

36. The base station of claim 34, wherein the indication of support for the one or more candidate kernels for DPoD operations comprises one or more of:
an indication of support for a set of candidate kernels for selection by the base station, or
an indication of a number of kernels supported for reception of the downlink communication.

37. The base station of claim 36, wherein the indication of the number of kernels supported for reception of the downlink communication comprises one or more of:
a number of kernels having orders that satisfy a threshold order that is supported for reception of the downlink communication, or
a number of kernels having orders that fail to satisfy the threshold order that is supported for reception of the downlink communication.

38. The base station of claim 36, wherein the indication of the number of kernels supported for reception of the downlink communication comprises one or more of:
a number of memory-based kernels that is supported for reception of the downlink communication, or
a number of memoryless kernels that is supported for reception of the downlink communication.

39. The base station of claim 34, wherein the one or more processors, to receive the indication of support for the one or more candidate kernels for DPoD operations, are configured to:
receive the indication of support via a periodic transmission of the indication of support, or
receive the indication of support via an aperiodic transmission of the indication of support.

40. The base station of claim 34, wherein the one or more processors, to receive the indication of support for the one or more candidate kernels for DPoD operations, are configured to receive the indication of support based at least in part on one or more of:
available computing resources of a mobile station,
available power resources of the mobile station,
a number of active component carriers associated with the mobile station,
a number of spatial division multiplexing streams associated with the mobile station, or
channel conditions associated with the downlink communication.

41. The base station of claim 34, wherein the one or more processors, to receive the indication of support for the one or more candidate kernels for DPoD operations, are configured to:
receive the indication of support for the one or more candidate kernels for DPoD operations via radio resource control signaling, or
receive the indication of support for the one or more candidate kernels for DPoD operations via one or more of uplink control information or a medium access control control element.

42. The base station of claim 34, wherein the one or more processors are further configured to:
transmit an indication of a selected set of candidate kernels for the downlink communication,
wherein the selected set of candidate kernels is based at least in part on the indication of support for the one or more candidate kernels.

43. The base station of claim 42, wherein the one or more processors, to receive the indication of the selected set of candidate kernels for the downlink communication, are configured to:
receive the indication via one or more of downlink control information or a medium access control control element.

44. The base station of claim 34, wherein the one or more processors, to receive the downlink communication based at least in part on the indication of support for the one or more candidate kernels for DPoD operations, are configured to:
receive the downlink communication having a compressed waveform based at least in part on the indication of support for the one or more candidate kernels for DPoD operations.

45. A non-transitory computer-readable medium storing a set of instructions for wireless communication, the set of instructions comprising:
one or more instructions that, when executed by one or more processors of a mobile station, cause the mobile station to:
transmit an indication of support for one or more candidate kernels for digital post distortion (DPoD) operations; and
receive a downlink communication based at least in part on the indication of support for the one or more candidate kernels for DPoD operations.

46. A non-transitory computer-readable medium storing a set of instructions for wireless communication, the set of instructions comprising:
> one or more instructions that, when executed by one or more processors of a base station, cause the base station to:
>> receive an indication of support for one or more candidate kernels for digital post distortion (DPoD) operations; and
>> transmit a downlink communication based at least in part on the indication of support for the one or more candidate kernels for DPoD operations.

47. An apparatus for wireless communication, comprising:
> means for transmitting an indication of support for one or more candidate kernels for digital post distortion (DPoD) operations; and
> means for receiving a downlink communication based at least in part on the indication of support for the one or more candidate kernels for DPoD operations.

48. An apparatus for wireless communication, comprising:
> means for receiving an indication of support for one or more candidate kernels for digital post distortion (DPoD) operations; and
> means for transmitting a downlink communication based at least in part on the indication of support for the one or more candidate kernels for DPoD operations.

\* \* \* \* \*